(12) United States Patent
Fukasawa

(10) Patent No.: US 11,519,490 B2
(45) Date of Patent: Dec. 6, 2022

(54) OIL SUPPLY UNIT

(71) Applicant: Honda Motor Co., Ltd., Tokyo (JP)

(72) Inventor: Shin Fukasawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 348 days.

(21) Appl. No.: 16/782,895

(22) Filed: Feb. 5, 2020

(65) Prior Publication Data

US 2020/0256452 A1  Aug. 13, 2020

(30) Foreign Application Priority Data

Feb. 13, 2019  (JP) .............................. JP2019-023130
Dec. 25, 2019  (JP) .............................. JP2019-233743

(51) Int. Cl.
*F16H 57/04* (2010.01)
*F16C 3/02* (2006.01)
*H02K 9/193* (2006.01)

(52) U.S. Cl.
CPC ............. *F16H 57/043* (2013.01); *F16C 3/02* (2013.01); *F16H 57/0426* (2013.01); *H02K 9/193* (2013.01); *F16C 2380/27* (2013.01); *F16H 57/0476* (2013.01)

(58) Field of Classification Search
CPC ...... F16H 57/043; F16H 57/0476; F16C 3/02; F16C 2380/27
See application file for complete search history.

(56) References Cited

U.S. PATENT DOCUMENTS

| | | | | |
|---|---|---|---|---|
| 6,015,359 A | * | 1/2000 | Kunii | F16H 57/0489 |
| | | | | 474/18 |
| 7,944,106 B2 | * | 5/2011 | Miller | F16H 57/0412 |
| | | | | 310/90 |
| 2013/0213740 A1 | * | 8/2013 | Tanaka | F16H 57/043 |
| | | | | 184/6.12 |
| 2018/0283527 A1 | * | 10/2018 | Sasaki | F16H 57/0471 |

FOREIGN PATENT DOCUMENTS

| | | |
|---|---|---|
| JP | H10252850 A | 9/1998 |
| JP | 2013170594 A | 9/2013 |
| JP | 2018159394 A | 10/2018 |

OTHER PUBLICATIONS

Japanese office action; Application 2019-233743; dated Feb. 1, 2022.

* cited by examiner

*Primary Examiner* — Tisha D Lewis
(74) *Attorney, Agent, or Firm* — Duft & Bornsen, PC

(57) ABSTRACT

A oil supply unit includes an axial body including an axial through hole along an axis and disposed so as to be rotatable around the axis, a pipe member disposed along the axis inside the axial through hole, a support member supporting an axial end of the pipe member, and a partitioning member partitioning a circular space between the axial body and an the pipe member to an axial direction. A first through hole and a second through hole are respectively formed to penetrate the pipe member and the axial body so that an oil supplied to an inside of the pipe member flows to a radial outside of the axial body through the circular space, and the partitioning member includes a tapered portion extending toward a radial inside and the axial direction of the axial body from the inner circumferential surface of the axial body.

5 Claims, 6 Drawing Sheets

LEFT ← → RIGHT

OIL SUPPLY UNIT

CROSS-REFERENCE TO RELATED APPLICATION

This application is based upon and claims the benefit of priority from Japanese Patent Application No. 2019-023130 filed on Feb. 13, 2019 and Japanese Patent Application No. 2019-233743 filed on Dec. 25, 2019, the content of which is incorporated herein by reference.

BACKGROUND OF THE INVENTION

Field of the Invention

This invention relates to an oil supply unit which supplies oil through oil passages in a rotating shaft.

Description of the Related Art

As an apparatus including this type of oil supply unit, there is known, for example, an apparatus described in Japanese Unexamined Patent Application Publication No. 2018-159394 (JP2018-159394A). In an oil supply unit included in the apparatus of JP2018-159394A, a pipe member is disposed in a through hole that axially penetrates a rotating shaft. This oil supply unit is configured to supply oil from the inside of the pipe member to components disposed around the rotating shaft through through holes that radially penetrate the pipe member and through holes that radially penetrate the rotating shaft.

For the apparatus of JP2018-159394A, the through hole that axially penetrates the rotating shaft needs to be previously filled with oil in order to supply the necessary and sufficient amount of oil to the components disposed around the rotating shaft. This configuration needs a large amount of oil, which may lead to increases in the pump capacity and thus the cost. On the other hand, if the axial through hole of the rotating shaft is partitioned so as to correspond to the components to which oil is to be supplied, in order to suppress an increase in the cost, ease of assembly of the apparatus is reduced when disposing the pipe member in the rotating shaft.

SUMMARY OF THE INVENTION

An aspect of the present invention is an oil supply unit includes an axial body including an axial through hole along an axis and disposed so as to be rotatable around the axis, a pipe member disposed along the axis inside the axial through hole, a support member configured to support an axial end of the pipe member, and a partitioning member disposed on an inner circumferential surface of the axial body to partition a circular space between the inner circumferential surface of the axial body and an outer circumferential surface of the pipe member to an axial direction. A first through hole and a second through hole are respectively formed to penetrate the pipe member and the axial body so that an oil supplied to an inside of the pipe member flows to a radial outside of the axial body through the circular space, and the partitioning member includes a tapered portion configured to extend toward a radial inside and the axial direction of the axial body from the inner circumferential surface of the axial body.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
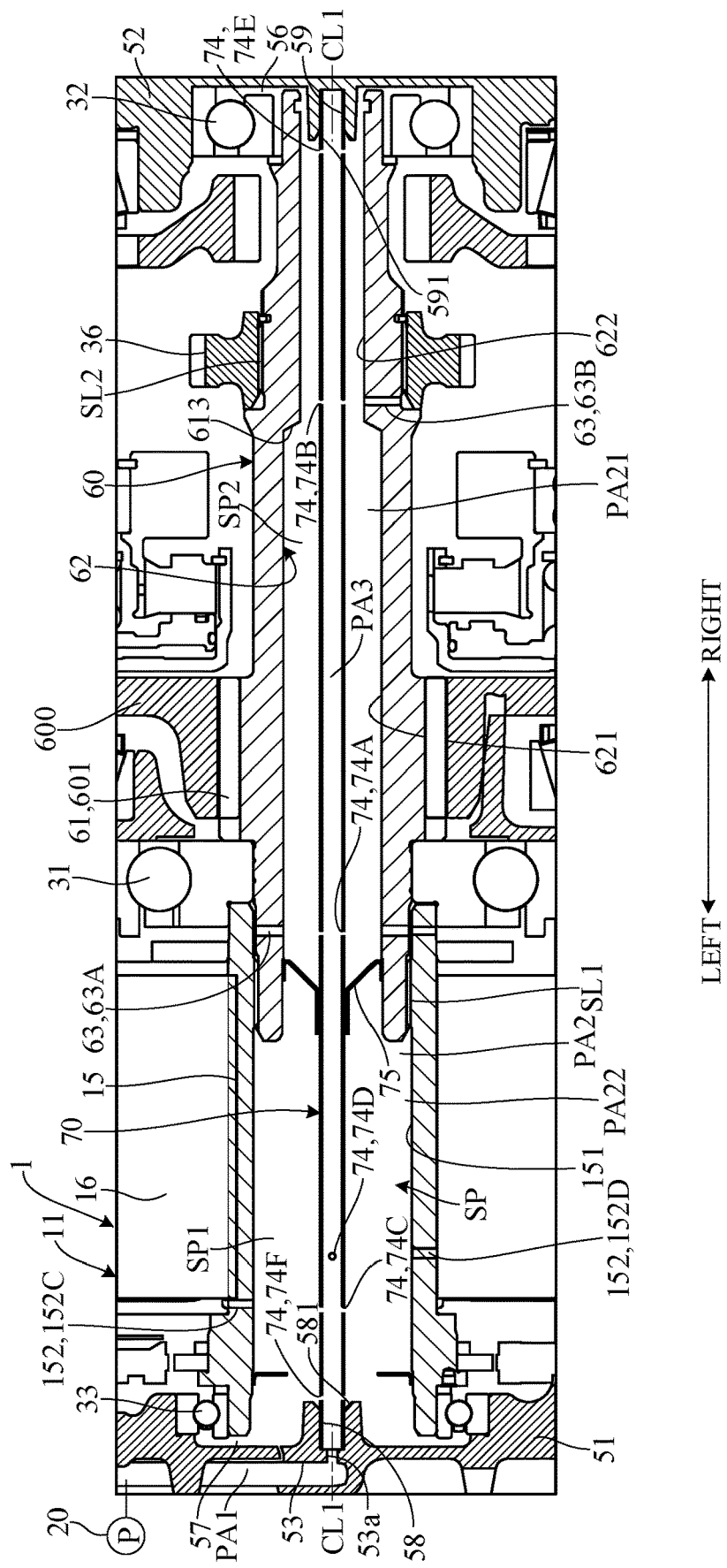
FIG. 1 is a sectional view showing a configuration of main components of an oil supply unit according to an embodiment of the present invention.

Now, an embodiment of the present invention will be described with reference to FIGS. 1 to 6. An oil supply unit according to an embodiment of the present invention supplies oil to components disposed around a rotating shaft through oil passages inside the rotating shaft. While this oil supply unit can be applied to various types of apparatuses, an example in which the oil supply unit is applied to a vehicle drive apparatus will be described below. FIG. 1 is a sectional view showing the configuration of main components of the oil supply unit according to the embodiment of the present invention. The axial direction is defined as the left-right direction as shown in the drawings for convenience, and the configuration of the components will be described in accordance with this definition. The left-right direction is, for example, a direction perpendicular to gravity and, specifically, is the width direction or length direction of the vehicle.

For example, the vehicle drive apparatus includes an electric travel motor as a travel drive source. That is, the vehicle having the vehicle drive apparatus mounted thereon is an electric vehicle. A torque outputted from the travel motor is transmitted to left and right drive shafts through a transmission and a differential mechanism and thus the vehicle travels. The vehicle drive apparatus may be used in an internal combustion engine vehicle including an engine as a drive source, or may be used in a hybrid vehicle including an engine and a travel motor as drive sources.

FIG. 1 shows a part of a travel motor 1. As shown in FIG. 1, the travel motor 1 includes an approximately cylindrical rotor 11 that rotates around an axis CL1 extending the left-right direction and a stator (not shown) that is disposed around the rotor 11. The travel motor 1 is contained in a case 51 (only a part thereof is shown) disposed therearound. For example, the travel motor 1 is formed as a magnet embedded synchronous motor. The travel motor 1 may be a synchronous reluctance motor, switched reluctance motor, or the like, which does not include a magnet. Although not shown, the case 51 has an opening on the right end surface thereof, and this opening is closed by a case cover 52 (only a part thereof is shown).

The rotor 11 includes an approximately cylindrical axial portion 15 that is disposed around the axis CL1 and a rotor core 16 that is fitted to the outer circumferential surface of the axial portion 15 and rotates integrally with the axial portion 15. The stator includes an approximately cylindrical stator core that is disposed around the axis CL1 so as to be radially spaced from the outer circumferential surface of the rotor 11 by a predetermined length. Multiple radially outward slots are circumferentially formed on the inner circumferential surface of the stator core. A winding (coil) wound by concentrated winding or distributed winding is disposed in each slot. By passing three-phase alternating current through the windings, a rotating magnetic field is produced and rotates the rotor 11.

An approximately cylindrical rotating shaft 60 is disposed around the axis CL1 on the right side of the rotor 11. A spline SL1 is formed on the outer circumferential surface of the left end of the rotating shaft 60. The right end of the axial portion 15 of the rotor 11 is fitted to the spline SL1 (spline coupling) so that the axial portion 15 and rotating shaft 60 rotate integrally. The axial portion 15 and rotating shaft 60 form an axial body that rotates around the axis CL1.

The left end and right end of the rotating shaft 60 are rotatably supported by the case 51 and case cover 52 with bearings 31 and 32, respectively, therebetween. The left end of the axial portion 15 is rotatably supported by the case 51 with a bearing 33 therebetween. The bearing 31 over the central portion in the left-right direction of the axial body is disposed adjacent to the right end of the axial portion 15 of the rotor 11.

A gear 61 is formed on the right side of the bearing 31 on the outer circumferential surface of the rotating shaft 60. A gear 601 of a rotor 600 disposed around the rotating shaft 60 is engaged with the gear 61, and rotation of the rotating shaft 60 is outputted to the rotor 600 through the gears 61 and 601. A spline SL2 is formed on the right side of the gear 61 on the outer circumferential surface of the rotating shaft 60. A parking gear 36 is fitted to the spline SL2 (spline coupling) so that and the rotating shaft 60 and parking gear 36 rotate integrally. Although not shown, a parking poll is slidably supported by the case 51 such that the nails thereof can be engaged with the parking gear 36. When the nails of the parking poll are engaged with the parking gear 36, a parking device is activated.

Oil is supplied to the components of the vehicle drive apparatus thus configured through oil passages PA1 and PA2. The oil passage PA1 extends radially along a left side wall 53 of the case 51, and the oil passage PA2 extends in the left-right direction along the axis CL1 in the axial portion 15 and rotating shaft 60. The oil passage PA1 communicates with an oil pump 20, as well as communicates with the oil passage PA2 through a through hole 53a that penetrates the side wall 53 along the axis CL1. Thus, oil discharged from the oil pump 20 is guided to the oil passage PA2 through the oil passage PM. The oil guided to the oil passage PA2 is supplied to the components, such as the rotor 11 and bearing 31, disposed around the rotating shaft 60 through through holes that radially penetrate the axial portion 15 and rotating shaft 60.

An approximately cylindrical through hole 62 is formed around the axis CL1 over the entire length in the left-right direction of the rotating shaft 60. The left end of the through hole 62 has a larger diameter than the right end thereof, and the through hole 62 is formed stepwise. Specifically, the through hole 62 has a left, approximately cylindrical large-diameter through hole 621 and a right, approximately cylindrical small-diameter through hole 622, and the large-diameter through hole 621 and small-diameter through hole 622 are connected through a tapered surface 613.

Approximately circular multiple through holes 63 are formed in the rotating shaft 60 so as to radially penetrate the rotating shaft 60. The through holes 63 are formed so as to correspond to the positions of the components that are disposed around the rotating shaft 60 and require supply of oil. For example, the through holes 63 (63A and 63B) are formed so as to correspond to the positions of the splines SL1 and SL2. The diameters of the through holes 63A and 63B are approximately equal to each other and smaller than those of the through holes 621 and 622.

Oil flowing out of the rotating shaft 60 through the left through hole 63A is supplied to the spline SL1 and lubricates the spline SL1. The oil flowing out of the rotating shaft 60 through the left through hole 63A is also supplied to the bearing 31 through a clearance between the axial portion 15 and rotating shaft 60 or through a through hole that radially penetrates the axial portion 15 and lubricates the bearing 31. That is, the left through hole 63A forms an oil passage for mainly lubricating the spline and bearing. On the other hand, oil flowing out of the rotating shaft 60 through the right through hole 63B is supplied to the spline SL2 and lubricates the spline SL2. That is, the left through hole 63B forms an oil passage for mainly lubricating the spline.

An approximately cylindrical through hole 151 is formed around the axis CL1 over the entire length in the left-right direction of the axial portion 15. Approximately circular multiple through holes 152 are formed in the axial portion 15 so as to radially penetrate the axial portion 15. The through holes 152 are formed so as to correspond to the positions of the components that are disposed around the axial portion 15 and require supply of oil. For example, the through holes 152 (152C and 152D) are disposed so as to correspond to the positions of the left end and central portion of the rotor core 16. The diameters of the through holes 152C and 152D are approximately equal to each other and approximately to equal to those of the through holes 63A and 63B.

Oil flowing out of the axial portion 15 through the left through hole 152C flows along the left surface of the rotor core 16 and thus cools the rotor core 16. That is, the through hole 152C forms an oil passage for mainly cooling the rotor. On the other hand, oil flowing out of the axial portion 15 through the right through hole 152D flows along the fitting surface between the axial portion 15 and rotor core 16 and thus cools the rotor 11. That is, the through hole 152D forms an oil passage for mainly cooling the rotor.

A cavity (communication passage) 56 is axially formed between the right end surface of the rotating shaft 60 and the case cover 52. The radially inner space (oil passage PA2) of the rotating shaft 60 and a bearing 32 communicate with each other through the communication passage 56. Oil is guided from the oil passage PA2 to the bearing 32 through the cavity 56 and lubricates the bearing 32. A cavity (communication passage) 57 is axially formed between the left end surface of the rotating shaft 15 and the case 51. The radially inner space (oil passage PA2) of the axial portion 15 and a bearing 33 communicate with each other through the communication passage 57. Oil is guided from the oil passage PA2 to the bearing 33 through the communication passage 57 and lubricates the bearing 33.

An approximately cylindrical pipe 70 is disposed around the axis CL1 in the radially inner space (oil passage PA2) of the axial body (axial portion 15 and rotating shaft 60), that is, in the through holes 62 and 151. The inner diameter of the pipe 70 is smaller than the diameter of the small-diameter through hole 622 of the rotating shaft 60 and larger than the diameters of the radial through holes 63 and 152. The thickness of the pipe 70 is smaller than those of the axial portion 15 and rotating shaft 60. An oil passage PA3 is formed along the axis CL1 inside the pipe 70.

A recess 58 is formed along the axis CL1 on the right end surface of the left side wall 53 of the case 51. The left end of the pipe 70 is fitted into the recess 58 by press fit or light press fit. A through hole 53a of the side wall 53 reaches the bottom surface of the recess 58. Thus, the left oil passage PA1 communicates with the internal space (oil passage PA3) of the pipe 70 through the through hole 53a and an opening surface on the left end of the pipe 70. A tapered surface 581 is formed on an entire circumference of the right end of the recess 58 (so as to guide insertion of the left end of the pipe 70 into the recess 58.

On the other hand, a recess 59 is formed along the axis CL1 on the left end surface of the case cover 52, and the right end of the pipe 70 is fitted into the recess 59 by press fit or light press fit. At this time, the right end surface of the inner oil passage PA3 of the pipe 70 is closed by the case cover 52 (the bottom surface of the recess 59). A tapered surface 591 is formed on an entire circumference of the left end of the recess 59 so as to guide insertion of the right end of the pipe 70 into the recess 59.

As seen above, the pipe 70 is supported inside the oil passage PA2 while being sandwiched between the recess 58 of the case 51 and the recess 59 of the case cover 52 and thus axially positioned. Accordingly, the oil passage PA2 in the through holes 62 and 151 of the rotating shaft 60 and axial portion 15 is the shape of a circle around the axis CL1. That is, the oil passage PA2 consists of a circular space SP.

Approximately circular multiple through holes 74 are formed in the pipe 70 so as to radially penetrate the pipe 70. The through holes 74 includes through holes 74A and 74B corresponding to the positions of the through holes 63A and 63B, respectively, of the rotating shaft 60 and through holes 74C and 74D corresponding to the positions of the through holes 152C and 152D, respectively, of the axial portion 15. The through holes 74 also include a through hole 74E that is formed on the right side of the through hole 74B and on the left side of the recess 59 and, more specifically, formed adjacent to the recess 59 and a through hole 74F that is formed on the left side of the through hole 74C and on the right side of the recess 58 and, more specifically, formed adjacent to the recess 58. Of the through holes 74A to 74F, the right through holes 74A, 74B, and 74E have larger diameters than the left through holes 74C, 74D, and 74F. A larger amount of oil can flow from the through holes 74A, 74B, and 74E than from the through holes 74C, 74D, and 74F.

A partitioning member 75 is mounted on the inner circumferential surface of the rotating shaft 60, that is, the circumferential surface of the large-diameter through hole 621. The partitioning member 75 is disposed on the left side of the through hole 63A and partitions the circular space SP (oil passage PA2) into left and right two spaces (SP1 and SP2). Specifically, the circular space SP is partitioned into the space SP1 facing the through holes 63A and 63B of the rotating shaft 60 and the space SP2 facing the through holes 152C and 152D of the axial portion 15. The space SP1 forms an oil passage PA21, and the space SP2 forms an oil passage PA22. Note that the mounting position of the partitioning member 75 only has to be on the left side of the through hole 63A of the rotating shaft 60 and may be, for example, at the left end of the rotating shaft 60.

Figure 2:
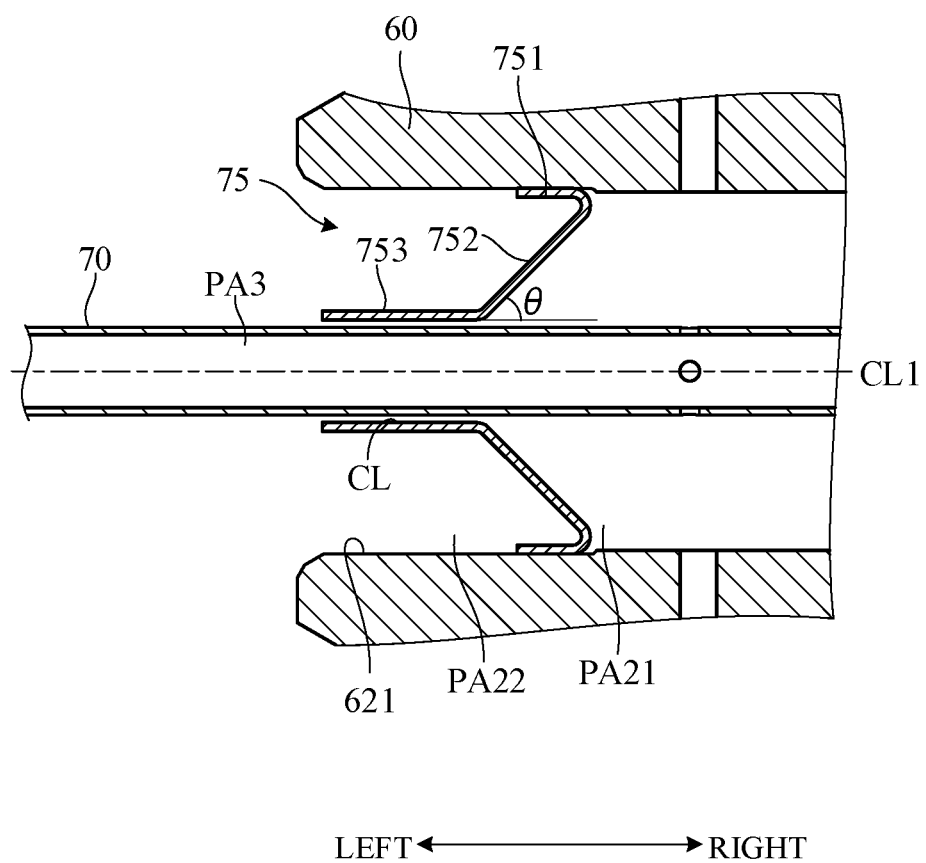
FIG. 2 is a main component enlarged view of FIG. 1.

FIG. 2 is a main component enlarged view of FIG. 1 showing the configuration of the partitioning member 75. As shown in FIG. 2, the partitioning member 75 includes an cylindrical portion (large-diameter cylindrical portion) 751 that is formed approximately cylindrical and is disposed around the axis CL1, an cylindrical portion (small-diameter cylindrical portion) 753 that is formed approximately cylindrical, has a smaller diameter than the cylindrical portion 751 and is disposed around the axis CL1, and a connector (tapered portion) 752 that connects the right end of the large-diameter cylindrical portion 751 and the right end of the small-diameter cylindrical portion 753. The diameter of the outer circumferential surface of the large-diameter cylindrical portion 751 is approximately equal to that of the large-diameter through hole 621 of the rotating shaft 60. The large-diameter cylindrical portion 751 is press-fitted into the rotating shaft 60 from the left end of the rotating shaft 60 and fixed to the circumferential surface of the large-diameter through hole 621.

The pipe 70 is disposed inside the small-diameter cylindrical portion 753. The inner diameter of the small-diameter cylindrical portion 753 is slightly larger than the outer diameter of the pipe 70 (e.g., by about 1 to 2 mm). A clearance CL is formed between the entire inner surface of the small-diameter cylindrical portion 753 and the entire outer circumferential surface of the pipe 70. For example, the axial length of the small-diameter cylindrical portion 753 is longer than the outer diameter thereof, that is, the small-diameter cylindrical portion 753 is formed so as to be axially long. This configuration is able to suppress leakage of oil from the oil passage PA21 to the oil passage PA22 through the clearance CL between the inner circumferential surface of the small-diameter cylindrical portion 753 and the outer circumferential surface of the pipe 70.

The right end of the small-diameter cylindrical portion 753 is located in a more left position than the right end of the large-diameter cylindrical portion 751. The tapered portion 752 is formed so as to be tapered around the axis CL1. That is, the tapered portion 752 is formed such that the diameter thereof is gradually reduced leftward. During assembly of the oil supply unit, the pipe 70 is guided to the radial center by the tapered portion 752 and inserted into the small-diameter cylindrical portion 753 from the right side of the partitioning member 75. The inclined angle θ of the tapered portion 752 with respect to the axis CL1 only has to be an angle that allows the left end of the pipe 70 to be guided into the small-diameter cylindrical portion 753 and is set to, for example, 45° to 60°.

Figure 3:
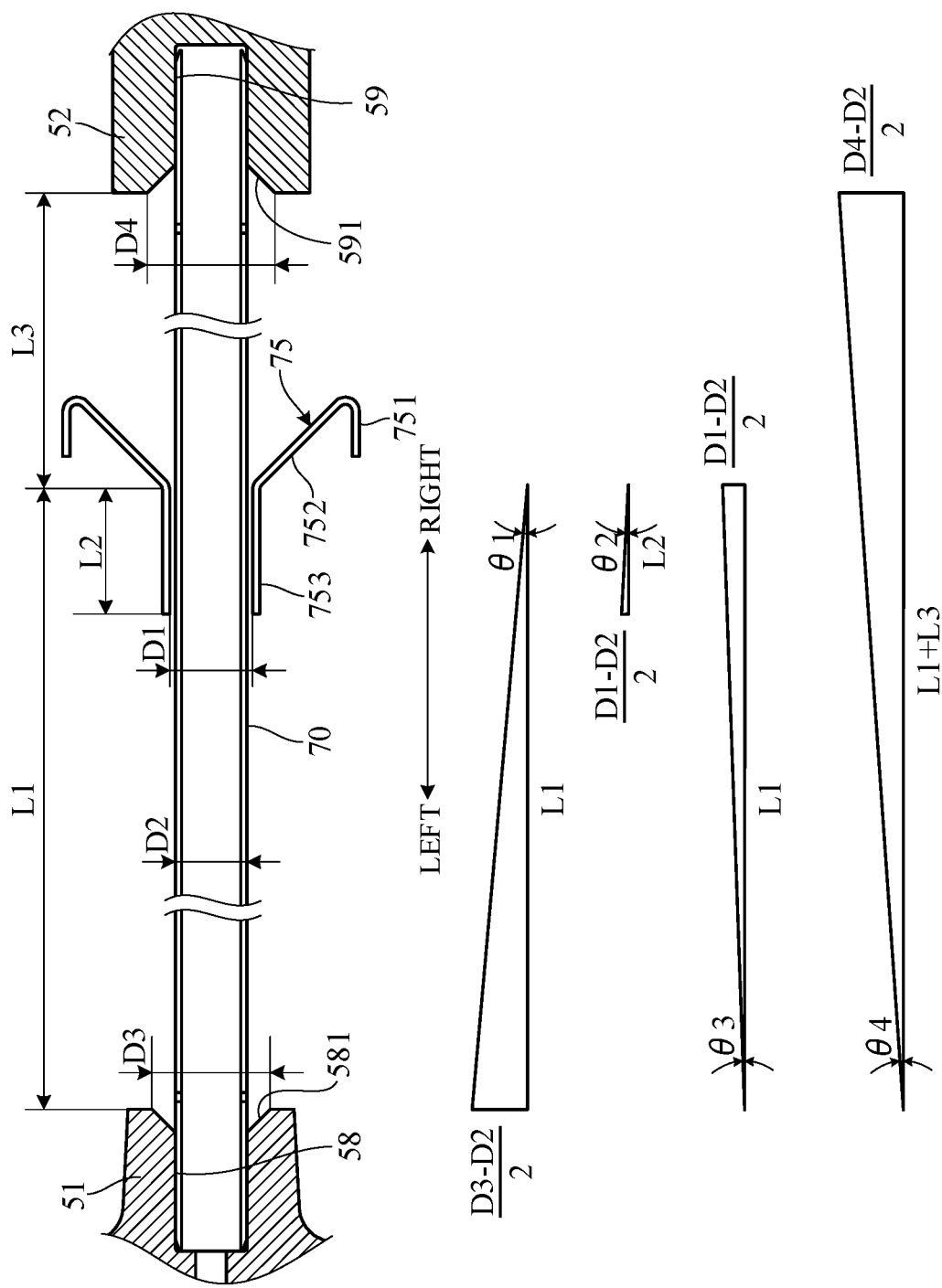
FIG. 3 is a drawing showing dimensions of main components of the oil supply unit of FIG. 1.

The oil supply unit is assembled by inserting the pipe 70 into the partitioning member 75 from the right side, fitting the left end of the pipe 70 into the recess 58 of the case 51, and then mounting the case cover 52 on the right surface of the case 51. FIG. 3 is a drawing showing the dimensions of main components of the oil supply unit according to the present embodiment. As shown in FIG. 3, the axial length from the entrance (right end surface) of the recess 58 of the side wall 53 of the case 51 to the right end of the small-diameter cylindrical portion 753 of the partitioning member 75 is defined as L1, the axial length of the small-diameter cylindrical portion 753 is defined as L2, the inner diameter of the small-diameter cylindrical portion 753 is defined as D1, the outer diameter of the pipe 70 is defined as D2, and the diameter of the entrance (right end surface) of the tapered surface 581 of the recess 58 is defined as D3.

The following Formula (I) holds.

$$\tan\theta_1 = (D3-D2)/(2 \cdot L1) \quad (I)$$

where θ1 represents the maximum inclined angle of the pipe 70 with respect to the axis CL1 in the period from when the left end of the pipe 70 passes through the partitioning member 75 until it reaches the entrance of the tapered surface 581 of the recess 58 during mounting of the pipe 70 to the recess 58 of the case 51.

During mounting of the pipe 70, radial displacement (the inclined angle with respect to the axis CL1) of the tip end of the pipe 70, that is, radial displacement thereof from the axis CL1 is regulated by the small-diameter cylindrical portion 753 of the partitioning member 75. In this case, the following Formula (II) holds.

$$\tan\theta 2 = (D1-D2)/(2 \cdot L2)/L2 \quad \text{(II)}$$

where $\theta 2$ represents the maximum inclined angle of the pipe 70 with respect to the axis CL1 in the period from when the left end of the pipe 70 passes through the right end of the cylindrical portion 753 until it reaches the left end of the cylindrical portion 753. $\theta 2$ is the maximum inclined angle of the pipe 70 regulated by the cylindrical portion 753. For this reason, when $\theta 2$ is smaller than $\theta 1$ ($\theta 1 > \theta 2$), the tip end (left end) of the pipe 70 can reach the tapered surface 581 of the recess 58. Accordingly, when the following Formula (III) holds on the basis of the above Formulas (I) and (II), the tip end of the pipe 70 that has passed through the partitioning member 75 can be fitted into the recess 58.

$$(D3-D2)/L1 > (D1-D2)/L2 \quad \text{(III)}$$

The foregoing are conditions for fitting the pipe 70 inserted into the through hole 62 from the right end of the rotating shaft 60, into the recess 58 of the case 51. In the present embodiment, the dimensions of the components are set such that these conditions are satisfied. Next, conditions for fitting the recess 59 of the case cover 52 to the right end of the pipe 70 will be described. In this case, as shown in FIG. 3, the axial length from the entrance (left end surface) of the recess 59 of the case cover 52 to the right end of the small-diameter cylindrical portion 753 of the partitioning member 75 is defined as L3, and the diameter of the entrance (left end surface) of the tapered surface 591 of the recess 59 is defined as D4.

The following Formula (IV) holds.

$$\tan\theta 3 = (D1-D2)/(2 \cdot L1) \quad \text{(IV)}$$

where $\theta 3$ represents the maximum inclined angle of the pipe 70 with respect to the axis CL1 regulated by the small-diameter cylindrical portion 753.

On the other hand, the following Formula (V) holds.

$$\tan\theta 4 = (D4-D2)/\{2 \cdot (L1+L3)\} \quad \text{(V)}$$

where $\theta 4$ represents the maximum inclined angle of the pipe with respect to the axis CL1 in the period until the right end of the pipe 70 reaches the entrance (left end surface) of the tapered surface 591 of the recess 59 of the case cover 52.

Thus, when $\theta 3$ is smaller than $\theta 4$ ($\theta 4 > \theta 3$), the recess 59 of the case cover 52 can be fitted to the tip end (right end) of the pipe 70. Accordingly, when the following Formula (VI) holds on the basis of the above Formulas (IV) and (V), the recess 59 can be fitted to the tip end of the pipe 70. In the present embodiment, the dimensions of the components are set such that these conditions are satisfied.

$$(D4-D2)/(L1+L3) > (D1-D2)/L1 \quad \text{(VI)}$$

Referring back to FIG. 1, a main operation of the oil supply unit according to the present embodiment will be described. During assembly of the oil supply unit, first, the rotating shaft 60 where the partitioning member 75 is mounted on the circumferential surface of the through hole 62 is coupled with the axial portion 15 so that the rotating shaft 60 is supported by the case 51. Next, the pipe 70 is inserted into the rotating shaft 60 from the right end of the rotating shaft 60. At this time, the tip end (left end) of the pipe 70 is guided by the tapered portion 752 of the partitioning member 75. Thus, the pipe 70 can be easily inserted into the small-diameter cylindrical portion 753. The radial position of the pipe 70 inserted into the small-diameter cylindrical portion 753 is regulated by the small-diameter cylindrical portion 753. Thus, the tip end of the pipe 70 can be easily fitted into the recess 58 of the case 51 through the tapered surface 581.

After having fitting the left end of the pipe 70 into the recess 58, the case cover 52 is mounted on the right end surface of the case 51 using, for example, a bolt. In this case, the radial position of the pipe 70 is regulated by the cylindrical portion 753 of the partitioning member 75. Thus, the recess 59 of the case cover 52 can be easily fitted to the right end of the pipe 70 through the tapered surface 591. As a result, the pipe 70 can be stably supported by the case 51 and case cover 52 with both ends thereof positioned by the case 51 and case cover 52.

In the oil supply unit thus assembled, oil discharged by driving the oil pump 20 is guided to the oil passage PA3 in the pipe 70 through the oil passage PA1 and through hole 53a. Part of the oil guided to the oil passage PA3 flows into the circular oil passage PA22 on the left side of the partitioning member 75 through the left through holes 74C, 74D, and 74F of the pipe 70. The oil that has flown into the oil passage PA22 moves to the inner circumferential surface side of the axial portion 15 by centrifugal force. The oil then flows out of the axial portion 15 through the through holes 152C and 152D and cools the rotor core 16, as well as flows into the communication passage 57 and lubricates the bearing 33.

The remainder of the oil guided to the oil passage PA3 flows into the circular oil passage PA21 on the right side of the partitioning member 75 through the right through holes 74A, 74B, and 74E of the pipe 70. The oil that has flown into the oil passage PA21 moves to the inner circumferential surface side of the rotating shaft 60 by centrifugal force. The oil then flows out of the rotating shaft 60 through the through holes 63A and 63B and lubricates the spline SL1 and bearing 31, as well as lubricates the spline SL2 and further flows into the communication passage 56 and lubricates the bearing 32.

The right through holes 74A, 74B, and 74E of the pipe 70 have larger diameters than the left through holes 74C, 74D, and 74F. For this reason, a larger amount of oil flows out of the pipe 70 into the oil passage PA21 than into the oil passage PA22, and the oil passage PA21 partitioned by the partitioning member 75 is filled with the oil. Thus, when the vehicle is inclined or when acceleration or deceleration in the front-rear direction or left-right direction acts on the vehicle, uneven distribution of oil in the rotating shaft 60 can be prevented. As a result, a sufficient amount of oil can be supplied to the components (e.g., bearing 31, splines SL1 and SL2, etc.) around the rotating shaft 60. Also, since there is no need to increase the pump capacity and the small oil pump can be used, an increase in the cost can be suppressed.

While the partitioning member 75 is disposed on the inner circumferential surface of the rotating shaft 60 and the slight clearance CL (FIG. 2) is present between the inner circumferential surface of the cylindrical portion 753 of the partitioning member 75 and the outer circumferential surface of the pipe 70, there is no clearance between the outer circumferential surface of the cylindrical portion 751 and the inner circumferential surface of the rotating shaft 60. This configuration is able to suppress leakage of the oil that has flown into the oil passage PA21 and then moved to the inner circumferential surface side of the rotating shaft 60 by centrifugal force, into the oil passage PA22 through the clearance between the cylindrical portion 753 and pipe 70. In addition, the cylindrical portion 753 is formed so as to be axially long. Thus, the small-diameter cylindrical portion 753 is able to perform a sealing function so that leakage of the oil through the radial inside of the cylindrical portion 753 is further suppressed.

Figure 4A:
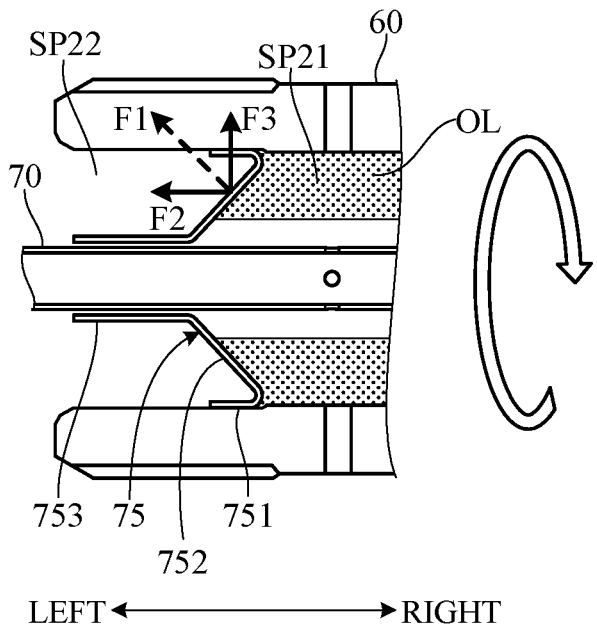
FIG. 4A is a drawing explaining a force that acts to main components of an oil supply unit according to an embodiment of the present invention.

FIG. 4A is a drawing schematically showing a force that oil OL in the oil passage PA21 exerts on the partitioning member 75 during rotation of the rotating shaft 60. In the present embodiment, the partitioning member 75 includes the tapered portion 752. For this reason, as shown in FIG. 4A, a force F1 by which the oil OL in the oil passage PA21 presses the partitioning member 75 is divided into a leftward force F2 and a radially outward force F3. The leftward force F2, that is, the pressing force F2 that acts in a direction in which the partitioning member 75 is removed becomes smaller. The radially outward pressing force F3 acts so as to press the partitioning member 75 against the inner circumferential surface of the rotating shaft 60. This configuration allows the partitioning member 75 to be stably held on the inner circumferential surface of the rotating shaft 60.

Figure 4B:
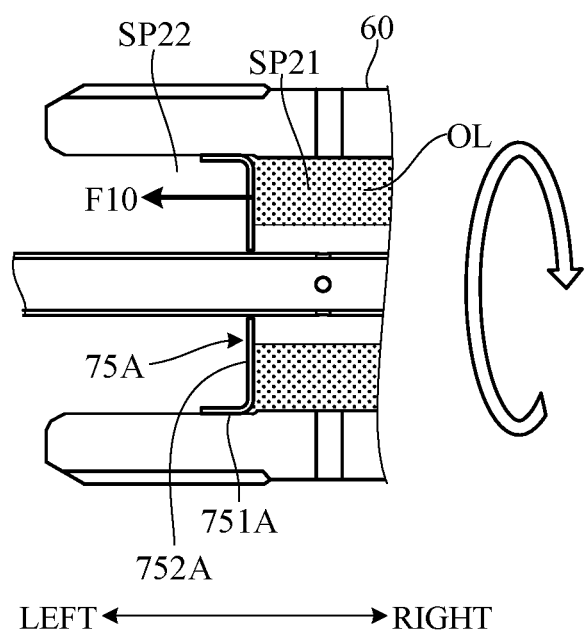
FIG. 4B is a drawing showing a comparative example of FIG. 4A.

FIG. 4B is a drawing showing a comparative example of FIG. 4A. In FIG. 4B, a partitioning member 75A has an approximately L-shaped cross-section and includes a cylindrical portion 751A that is fitted to the inner circumferential surface of a rotating shaft 60 and a plate 752A that extends radially inward from an end of the cylindrical portion 751A. In this example, as shown in FIG. 4B, a force F10 by which oil OL in an oil passage PA21 presses the partitioning member 75A is only a force that presses the plate 752A leftward and is larger than the force F2 (FIG. 4A) that presses the tapered portion 752 leftward. For this reason, in the configuration of FIG. 4B, the partitioning member 75A may move leftward and fall from the rotating shaft 60.

The embodiment of the present invention is able to produce the following advantageous effects.

(1) The oil supply unit includes the axial body (rotating shaft 60, axial portion 15) that includes the axial through hole (through holes 62 and 151) extending along the axis CL1 in the left-right direction and is disposed so as to be rotatable around the axis CL1, the pipe 70 disposed along the axis CL1 inside the through holes 62 and 151, the case 51 and case cover 52 that support the left and right ends of the pipe 70, and the partitioning member 75 that is disposed on the inner circumferential surface of the rotating shaft 60 and partitions the circular space SP between the inner circumferential surface of the rotating shaft 60 and axial portion 15 and the outer circumferential surface of the pipe 70 to an axial direction (FIG. 1). The through holes 74 penetrating the pipe 70 and the through holes 63 and 152 penetrating the rotating shaft 60 and axial portion 15 are formed to penetrate the pipe 70 and the rotating shaft 60 and axial portion 15 so that oil supplied into the pipe 70 flows to the radial outside of the rotating shaft 60 and axial portion 15 through the circular space SP (FIG. 1). The partitioning member 75 includes the tapered portion 752 that extends in a radially inward and leftward direction (the insertion direction of the pipe 70) from the inner circumferential surface of the rotating shaft 60 (FIG. 2).

This configuration allows the pipe 70 inserted into the rotating shaft 60 and axial portion 15 to be regulated by the partitioning member 75, thereby allowing the ends of the pipe 70 to be easily fitted into the recesses 58 and 59 along the axis CL1. Also, the circular space SP in the rotating shaft 60 and axial portion 15 is partitioned by the partitioning member 75. Thus, the oil passage PA21 of the space SP2 partitioned by the partitioning member 75 can be filled with oil without having to use a large-capacity oil pump. As seen above, the oil supply unit can be easily assembled and be formed at low cost.

(2) The partitioning member 75 includes the small-diameter cylindrical portion 753 that is connected to the inner diameter-side end (end on inner diameter side) of the tapered portion 752 and extends around the pipe 70 along the axis CL1 (FIG. 2). Thus, the small-diameter diameter cylindrical portion 753 is able to perform a sealing function so that leakage of oil from the oil passage PA21 to the oil passage PA22 partitioned by the partitioning member 75 is suppressed. Also, since the small-diameter cylindrical portion 753 regulates the position of the pipe 70, the ends of the pipe 70 are easily fitted into the recesses 58 and 59 during assembly.

(3) The through holes 63 and 152 that radially penetrate the rotating shaft 60 and axial portion 15 are formed so as to correspond to the positions of the predetermined components (splines SL1 and SL2, rotor core 16, etc.) around the rotating shaft 60 and axial portion 15 so that oil is supplied to the predetermined components (FIG. 1). The through holes 74 that radially penetrate the pipe 70 are formed in approximately the axially same positions as the through holes 63 and 152. Thus, oil flowing from the oil passage PA3 in the pipe can be efficiently guided to the components or the like around the rotating shaft 60 and axial portion 15.

(4) The through hole 62 of the rotating shaft 60 includes the left large-diameter through hole 621 and right small-diameter through hole 622 (FIG. 1). The partitioning member 75 is disposed on the inner circumferential surface of the large-diameter through hole 621 such that the tapered portion 752 extends in the radially inward-leftward direction from the inner circumferential surface of the large-diameter through hole 621 (FIG. 2). Thus, even if the rotating shaft 60 is formed stepwise, both ends of the pipe 70 can be easily fitted into the recesses 58 and 59 of the case 51 and case cover 52 thanks to the single partitioning member 75 mounted on the inner circumferential surface of the rotating shaft 60. This advantageous effect will be described with reference to FIG. 5, which is a comparative example of FIG. 1.

Figure 5:
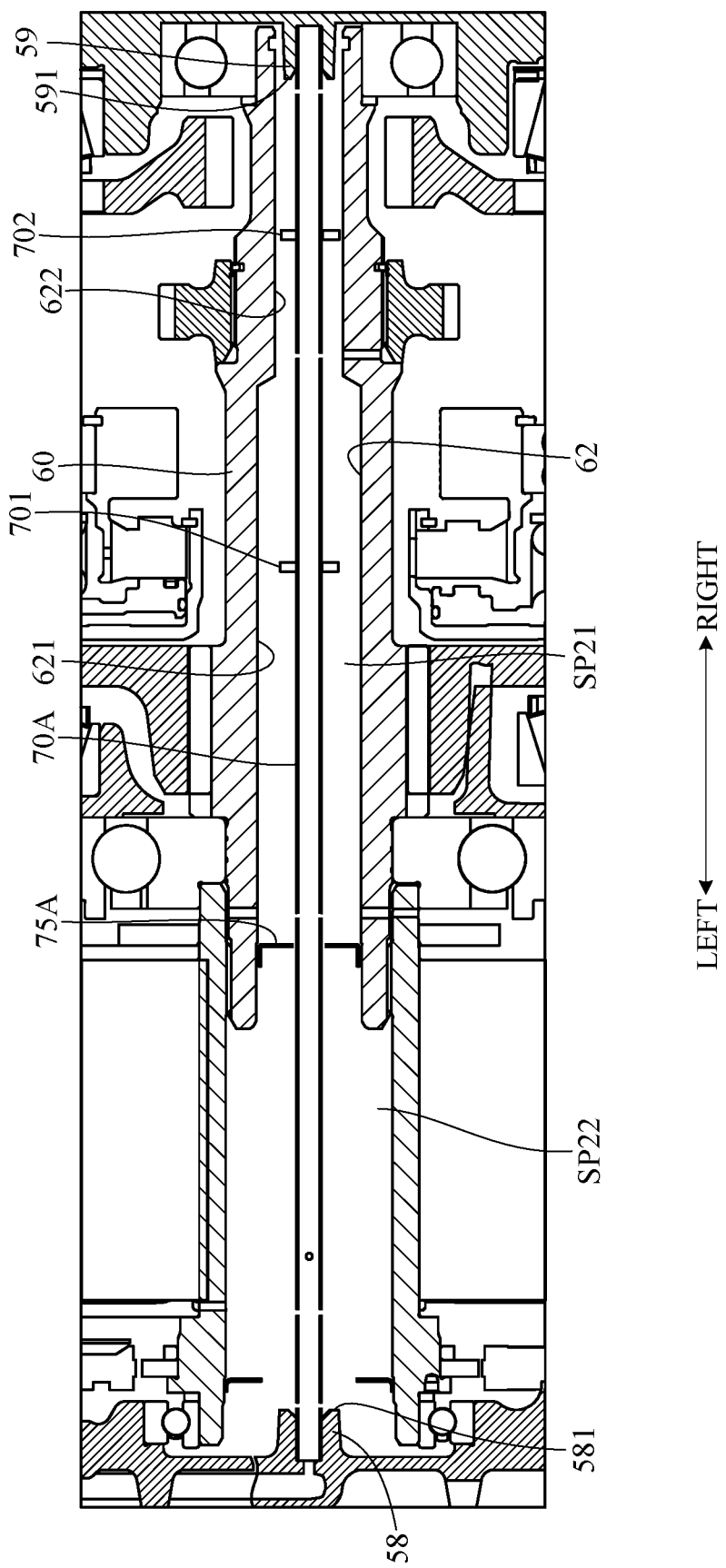
FIG. 5 is a drawing showing a comparative example of FIG. 1.

In FIG. 5, the partitioning member 75A of FIG. 4B is mounted on the inner circumferential surface of a rotating shaft 60. A pair of approximately circular left guides 701 and a pair of approximately circular right guides 702 are disposed on the outer circumferential surface of a pipe 70A so as to protrude radially outward. The guides 701 and 702 are formed such that the outer diameters thereof are slightly smaller than the diameter of a small-diameter through hole 622 of the rotating shaft 60. When the tip end (left end) of the pipe 70A inserted into the rotating shaft 60 passes through the through hole in the center of the partitioning member 75A, the left guides 701 are located inside the small-diameter through hole 622. That is, the guides 701 regulate the position of the pipe 70A when the pipe 70A is inserted into the through hole of the partitioning member 75A. Similarly, when the tip end of the pipe 70A is fitted into a recess 58 of a case 51, the right guides 702 are located inside the small-diameter through hole 622. That is, the guides 702 regulate the position of the pipe 70A when fitting the pipe 70A into the through hole 58.

As seen above, in the example of FIG. 5, prior to inserting the pipe 70A into the stepwise through hole 62, the guides 701 and 702 need to be disposed on the outer circumferential surface of the pipe 70A, leading to complication of the configuration of the pipe 70A and an increase in the cost. On the other hand, in the present embodiment, there is no need to dispose guides or the like on the outer circumferential surface of the pipe 70, allowing for simplification of the configuration of the pipe 70 and suppression of an increase in the cost.

(5) The case 51 and case cover 52 include the recesses 58 and 59 into which the left and right ends of the pipe 70 are fitted (FIG. 1). Thus, the pipe 70 can be stably supported inside the rotating shaft 60.

Figure 6:
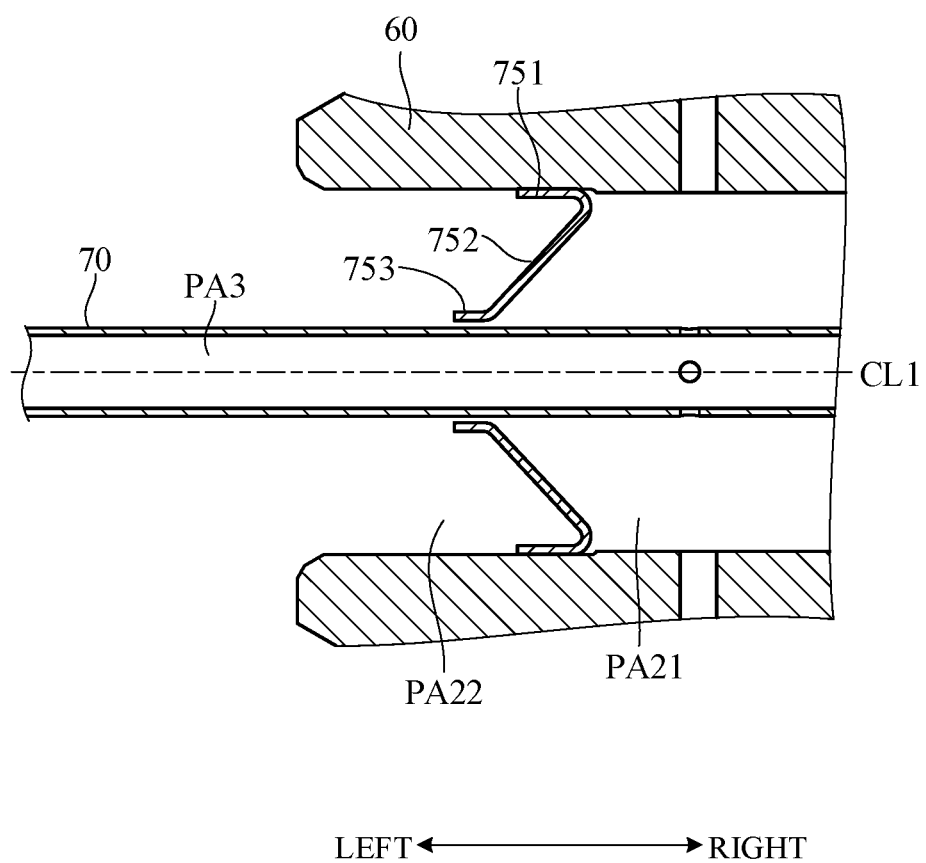
FIG. 6 is a drawing showing a modification of FIG. 2.

The above-mentioned embodiment can be modified into various forms. Hereafter, some modifications will be described. While, in the above embodiment, the axial length of the small-diameter cylindrical portion 753 of the partitioning member 75 is longer than the outer diameter of the small-diameter cylindrical portion 753, an axial length of a small-diameter cylindrical portion may be equal to an outer diameter thereof as long as the small-diameter cylindrical portion can perform a function of sufficiently sealing oil. Also, as shown in FIG. 6, which is a modification of FIG. 2, the axial length of a small-diameter cylindrical portion 753 may be shorter than the outer diameter thereof. That is, the configuration of a cylindrical portion connected to an inner diameter-side end of a tapered portion is not limited to that described above. While, in the above embodiment, the rotating shaft 60 and axial portion 15 form the axial body, a single rotating member may form an axial body. Accordingly, a configuration of through holes formed on the axial body along the axis CL1, that is, the axial through holes is not limited to that described above.

While, in the above embodiment, the pipe (pipe member) 70 is disposed along the axis CL1 inside the through holes 62 and 151 of the rotating shaft 60 and axial portion 15, the configuration of the pipe member is not limited to that described above. For example, a pipe member having one opened axial end and another closed end may be used. While, in the above embodiment, the recesses 58 and 59 of the case 51 (first support member) and case cover 52 (second support member) support both ends of the pipe 70, the support members may be configured otherwise. In the above embodiment, the partitioning member 75 includes the pair of cylindrical portions 751 and 753 and the tapered portion 752 that connects the cylindrical portions 751 and 753. That is, the partitioning member 75 includes the small-diameter cylindrical portion 753 serving as a first cylindrical portion and the large-diameter cylindrical portion 751 serving as a second cylindrical portion that extend in the same direction (leftward) from the tapered portion 752. However, a partitioning member may have any configuration as long as it axially partitions the circular space between an inner circumferential surface of a axial body and an outer circumferential surface of a pipe member to an axial direction and includes a tapered portion that extends in a radially inward direction and the axial direction from the inner circumferential surface of the axial body. Multiple partitioning members may be axially disposed such that the circular space is axially partitioned into three or more spaces.

While, in the above embodiment, the through holes 63 and 152 (second through hole) are formed in the rotating shaft 60 and axial portion 15 so that oil is supplied to the components or the like disposed around the rotating shaft 60 and axial portion 15 and the through holes 74 (first through hole) are formed in approximately the axially same positions as the through holes 63 and 152, of the pipe 70, the positions or numbers of first through holes and second through holes are not limited to those described above. While, in the above embodiment, the large-diameter through hole 621 (large diameter portion) and small-diameter through hole 622 (small diameter portion) are formed in the rotating shaft 60, axial through holes may be formed so as to be flat rather than being stepwise. While, in the above embodiment, the right end of the pipe 70 is closed by the case cover 52, both ends of a pipe member may be opened so that oil axially flows through the pipe member.

While the example in which the oil supply unit is applied to a vehicle drive apparatus will be described above, the oil supply unit of the present invention can be applied to various types of apparatuses other than a vehicle drive apparatus.

The above embodiment can be combined as desired with one or more of the above modifications. The modifications can also be combined with one another.

According to the present invention, it is possible to prevent the liquid spilled out of the inlet port from reaching the connecting portion and causing an electrical failure of the connecting portion.

Above, while the present invention has been described with reference to the preferred embodiments thereof, it will be understood, by those skilled in the art, that various changes and modifications may be made thereto without departing from the scope of the appended claims.

What is claimed is:

1. A oil supply unit comprising:
   an axial body including an axial through hole along an axis and disposed so as to be rotatable around the axis;
   a pipe member disposed along the axis inside the axial through hole;
   a support member configured to support an axial end of the pipe member; and
   a partitioning member disposed on an inner circumferential surface of the axial body to partition a circular space between the inner circumferential surface of the axial body and an outer circumferential surface of the pipe member to an axial direction, wherein
   a first through hole and a second through hole are respectively formed to penetrate the pipe member and the axial body so that an oil supplied to an inside of the pipe member flows to a radial outside of the axial body through the circular space,
   the partitioning member includes a tapered portion configured to extend toward a radial inside and the axial direction of the axial body from the inner circumferential surface of the axial body, and a cylindrical portion connected in a manner to be contiguous to an end on an inner diameter side of the tapered portion to extend around the pipe member along the axis,
   the tapered portion is configured to extend toward the radial inside and one side of the axial direction along the axial body from the inner circumferential surface of the tapered portion,
   the cylindrical portion is a first cylindrical portion configured to extend in the one side of the axial direction along the axial body from the end on the inner diameter side of the tapered portion,
   the partitioning member further includes a second cylindrical portion configured to extend in the one side of the axial direction along the axial body from an outer circumferential surface of the tapered portion and is fixed on the inner circumferential surface of the axial body, and
   the support member includes a recess into which an end of the axial direction of the pipe member is fitted.

2. The oil supply unit according to claim 1, wherein
   the second through hole is formed so as to correspond to a position of a predetermined component around the axial body so that the oil is supplied to the predetermined component, and the first through hole is disposed in approximately an axially same position as the second through hole.

3. The oil supply unit according to claim 1, wherein
the axial through hole includes a large diameter portion in one side of the axial direction and a small diameter portion in another side of the axial direction, and
the partitioning member is disposed on an inner circumferential surface of the large diameter portion such that the tapered portion extends toward the radial inside and the one side of the axial direction from the inner circumferential surface of the large diameter portion.

4. The oil supply unit according to claim 1, wherein the support member includes a first support member configured to support one end of the axial direction of the pipe member and a second support member configured to support another end of the axial direction of the pipe member, the first support member and the second support member respectively include the recess into which an end of the axial direction of the pipe member is fitted.

5. The oil supply unit according to claim 1, wherein a tapered portion is formed on an entire circumference of an entrance of the recess.

* * * * *